Dec. 27, 1966  A. KREI  3,293,784
COMBINATION AUTOMOBILE VISOR AND MAP HOLDER
Filed July 9, 1964  2 Sheets-Sheet 1
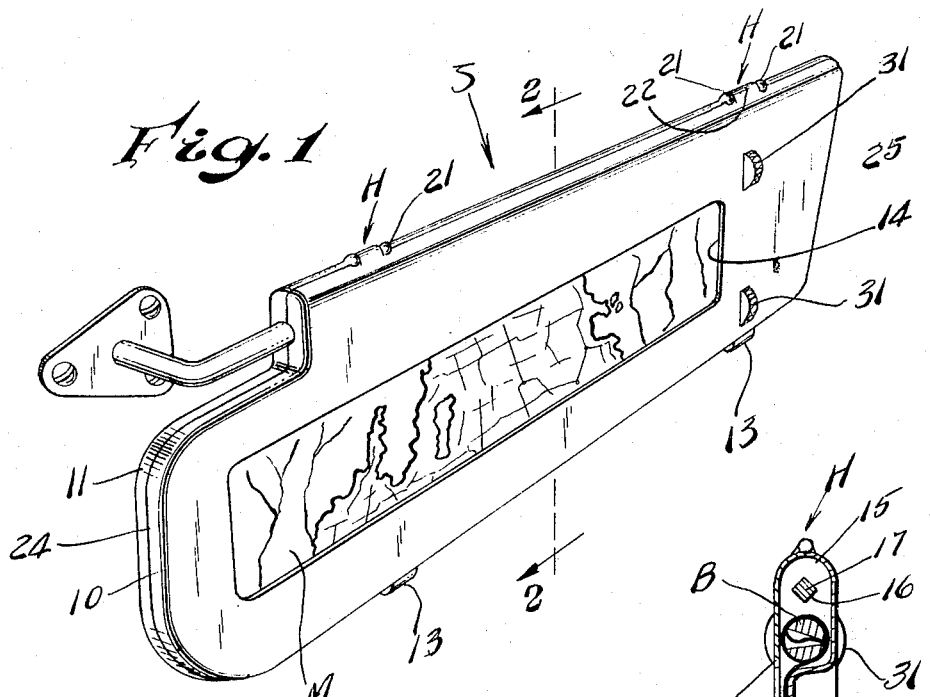
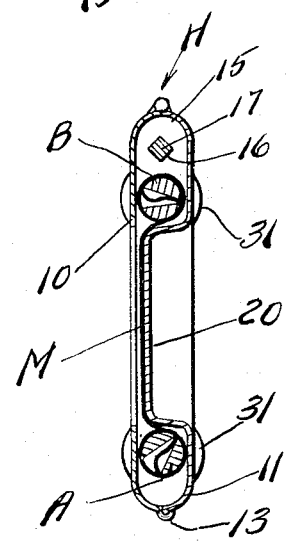
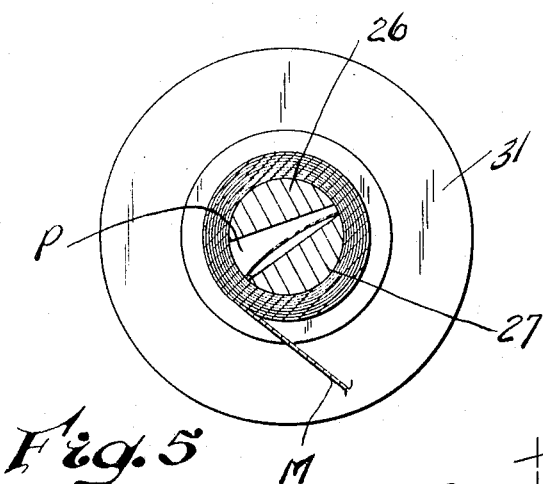
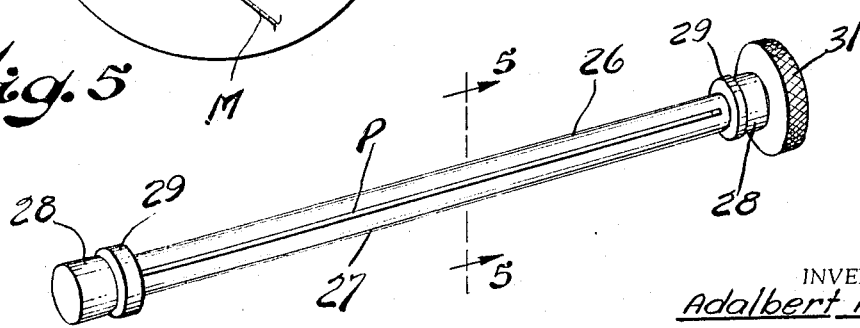
INVENTOR.
Adalbert Krei
BY
Learman Learman &
McCulloch
ATTORNEYS

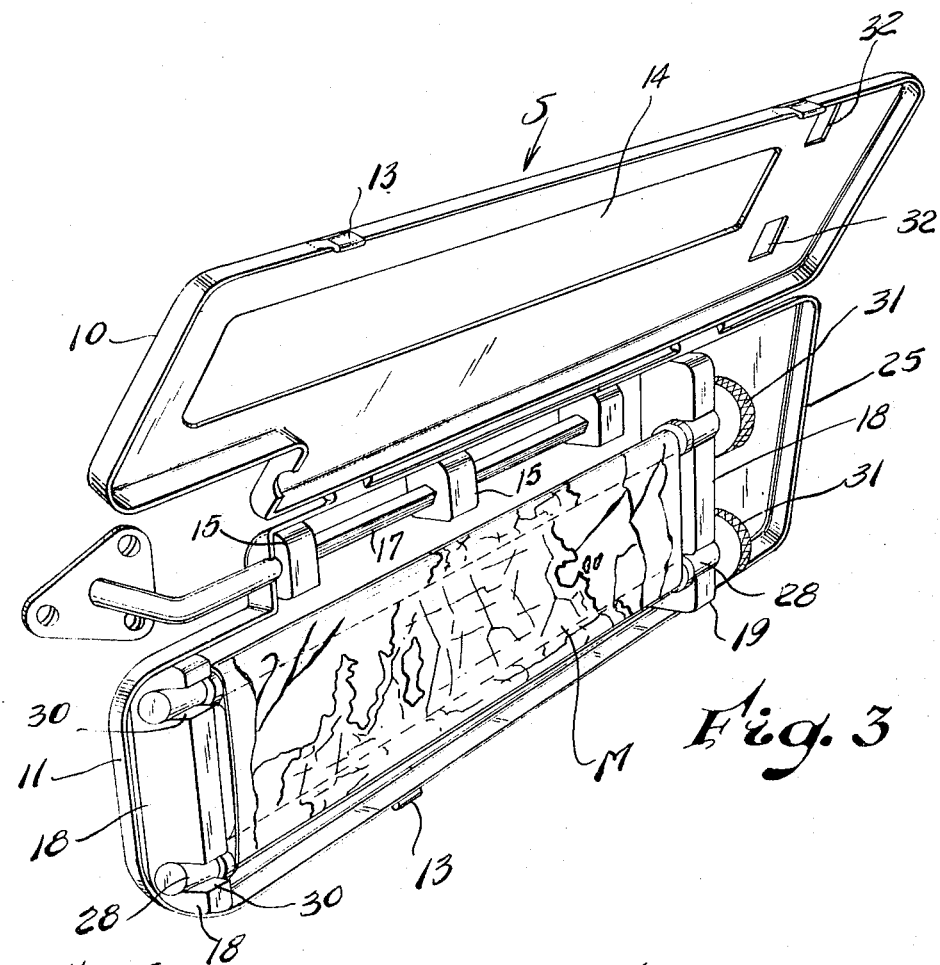
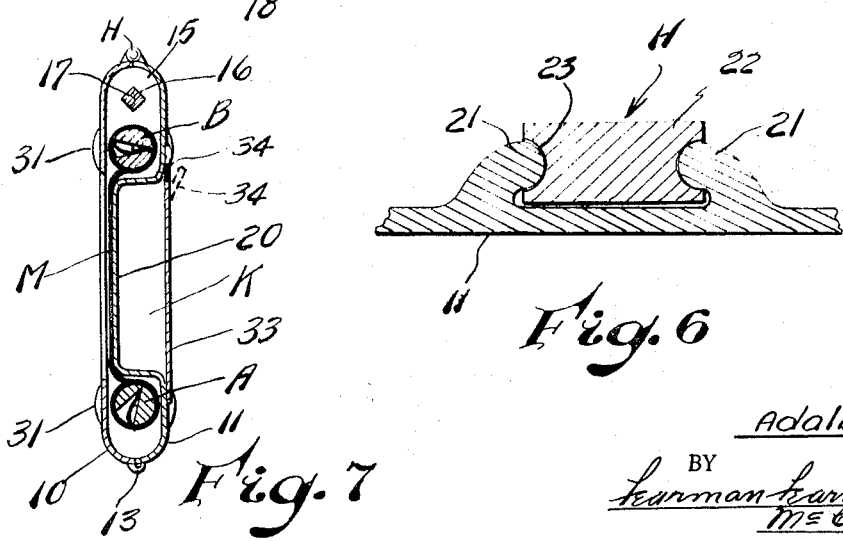

United States Patent Office 3,293,784
Patented Dec. 27, 1966

3,293,784
COMBINATION AUTOMOBILE VISOR AND
MAP HOLDER
Adalbert Krei, 843 Boutell Road,
Essexville, Mich. 48732
Filed July 9, 1964, Ser. No. 381,387
3 Claims. (Cl. 40—86)

This invention relates to a combination automobile visor and map holder, and more particularly to a combination in which a rolled map is mounted in the visor with means thereon for rolling said map in either direction across the face of the visor to show the road marking on the map.

One of the prime objects of the invention is to provide an improved road map holder for automobiles which is shaped dimensional and mounted to also serve as an interior sun visor for the driver when seated in position in the vehicle, said visor having capacity sufficient to hold large maps or several small limited maps, and which is formed of a translucent material which eliminates sun glare, and also serving as a shield against headlight rays of another oncoming or following vehicle with bright lights.

Another object of the invention is to design a map holder formed of lightweight translucent material which is attractive in appearance and in which the maps can be readily mounted and wound in either direction as desired as the trip progresses, and which is provided with readily engageable finger engaging means to actuate the rollers to wind the map.

A further object of the invention is to provide a very simple, practical, and relatively inexpensive visor map holder which can be readily manufactured and assembled, which is easy to use, neat and attractive in appearance, and which lends itself to quantity production methods with the savings incident thereto.

A further object still is to provide a map holder having simple and practical means for mounting and/or removing the map from the visor, the face of the map being positioned for easy reading by the driver as the vehicle travels over the highways.

Still a further object is to provide a compartment in the visor for storing extra maps, letters, keys, and other objects which cannot be stored in the glove compartment and in which the various articles can be easily and quickly inserted and removed when desired.

With the above and other objects in view, the present invention consists in the combination and arrangement of parts, hereinafter more fully described, illustrated in the accompanying drawings, and more particularly pointed out in the appended claims; it being understood that changes may be made in the form, size, proportion and minor details of construction, without departing from the spirit, or sacrificing any of the advantages of the invention.

In the drawings:

FIG. 1 is a front elevational view of the sun visor and map holder.

FIG. 2 is a transverse, sectional view thereof, taken on the line 2—2 of FIG. 1.

FIG. 3 is a similar view to FIG. 1 showing the hinge action of the visor sections.

FIG. 4 is a perspective view showing one of the rollers.

FIG. 5 is an enlarged, transverse sectional view thereof, taken on the line 5—5 of FIG. 4 and illustrating the manner of anchoring the ends of the map.

FIG. 6 is a fragmentary, enlarged sectional view showing the hinge connection for the sections of the visor.

FIG. 7 is a view similar to FIG. 2 showing the pocket in the visor.

Referring now more particularly to the drawings in which I have shown the preferred embodiment of my invention.

The letter S indicates a sun visor which is preferably formed in two panels 10 and 11, respectively, hingedly connected at their upper edge as at H, with a locking means 13 provided on the lower edge for firmly locking the panels together, the front panel 10 being formed with an enlarged opening 14 for exposing the face of the map M when it is mounted in position, and a plurality of spaced apart supports 15 are provided on the upper edge of the rear panel 11, and has squared openings 16 therein to accommodate the square rod 17 provided in the vehicle and on which the visor S is mounted. Vertically disposed supports 18 and 19, respectively, are provided on the back panel directly adjacent the ends thereof, said back panel being formed with an inwardly pressed section 20 substantially the same size as the opening in the front panel, said section being substantially flush with the face of the visor when the panels are closed, and serving as a flat solid surface over which the map travels as it is rolled, preventing wrinkling, etc. of the map, and also forming a base so that notes can be made on the map when desired, without puncture or tearing thereof.

The sun visor panels 10 and 11 are formed of a translucent plastic which has lubricating qualities and prevents squeaks, etc.

The hinges H are provided on the upper edge of the visor, the upper edge of the rear panel having pairs of spaced apart ball-shaped sections 21—21 formed integral therewith, and upwardly projecting legs 22 are provided on the front panel 10, the side edges of which are formed with ball-shaped seats 23 in which the ball-shaped sections 21—21 are hingedly mounted, the material being sufficiently resilient to permit snapping the hinge connections in place.

Forming the visor of translucent plastic presents a number of other advantages in that the portions thereof not covered by the map serve to absorb the sun's rays, dim the headlight glare, etc. from oncoming or following vehicles, and further enabling the driver to see the roadway through the edges of the translucent visor when viewing the map without shifting his or her body in the seat. One end section 24 of the front and rear panels 10 and 11 is rounded as shown, and the opposite end 25 of the visor is angularly shaped merely as a matter of design, and it will be obvious, that whereas the driver cannot see the roadway through the map, he can see the highway through the top, bottom and end sections of the visor around the map.

The map mounting means comprises a pair of rollers A and B mounted on the visor S, and as these are of identical construction, a description of one will suffice for both. Each roller is formed in two pieces 26 and 27, respectively, said pieces when in assembled relation forming a V-shaped passage P through the roller to facilitate threading the end of map M therein.

A cylindrical plastic bearing member 28 is mounted on one end of each roller and is formed with a flange 29 formed integral therewith, said bearing being revolvably mounted in a bearing seat 30 provided in the members 18 and 19. The opposite end of the roller is of the same general shape, it also has a cylindrical bearing section 28 and is formed with an enlarged turning knob 31, the rim of said turning knob extending through openings 32 provided in the walls of the front and rear panels respectively, so that the knobs 31 can be engaged by the fingers of the driver when the map is rolled.

To attach the map to the visor, it is merely necessary to insert one end of the map through the passage opening P provided in the lower roller A, and then wind the map thereon, next place the bearings 28 and in position in the seats 30—30, then thread the upper end of the map through the slit P in the upper roller, make a couple of winds to lock the map on the roller (see FIG. 5) and place the bearings 28 in position in the seats 30 on the supports 18 and 19, then lock the visor panels together by means of the locking members 13. The operator then grasps one of the turning knobs 31, depending on whether it is desired to wind or unwind, and the map can be rolled in the desired direction.

It will, of course, be understood that the visor can be used in the conventional manner when there is no map mounted therein. It can be positioned to shield the driver's eyes from glare still permitting him to see the roadway for safe driving.

In FIG. 7 of the drawings, I have shown a modified construction in which a sheet of plastic 33 spans the section 20, the ends and lower section of which are adhesively secured to the panel 10. The upper section of the pocket K is open and a resilient strip 34 forms the upper edge of the sheet, thus forming a pocket for storage of maps, letters, keys, and other items.

From the foregoing description, it will be obvious that I have perfected a very simple, practical and inexpensive roll strip road map holder, formed of a translucent plastic material which permits the driver to see the roadway and protects his eyes from headlight glare and the sun's rays.

I claim:

1. A combination interior automobile visor and map holder comprising: a pair of hingedly connected front and rear panels, the front panel having an enlarged window opening therein; an inwardly pressed section in the back panel of substantially the same size and shape as the window opening in the front panel and extending thereinto when the panels are secured together; said inwardly pressed section forming a backing for a map traveled thereover vertically disposed supports secured to the rear panel; longitudinally extending rollers journaled in said supports and on which a map is wound, and turning knobs mounted on said rollers and projecting through said hingedly connected panels for travel and winding the map on the rollers.

2. The combination defined in claim 1 in which each roller comprises: two circumferentially spaced apart, elongated strips forming a V-shaped slit through the roller, bearings on the roller mounted in said vertical supports, and flexible means spanning the inwardly pressed section to form a closure and pocket for map storage.

3. A combination interior automobile visor and map holder comprising: a pair of hingedly connected front and rear panels; an enlarged open window provided in the front panel; an inwardly projecting section on the rear panel; said section being of substantially the same size and shape as the enlarged window opening and projecting thereinto; and forming a trackway for a map, visor accommodating supports provided on the upper edge of the rear panel vertically disposed roller supports provided in the rear panel; rollers mounted in said supports directly above and below said inwardly projecting section and on which a road map is wound; turning knobs mounted on said rollers and projecting through the hinged panels to permit easy manipulation thereof, and means for locking the hinged panels in assembled relation.

References Cited by the Examiner

UNITED STATES PATENTS

| 1,517,605 | 12/1924 | Warren | 40—86 |
| 2,485,802 | 10/1949 | Asachika | 40—86 |
| 2,853,817 | 9/1958 | Palm | 40—86 |

EUGENE R. CAPOZIO, *Primary Examiner.*

W. GRIEB, *Assistant Examiner.*